United States Patent Office 2,774,759
Patented Dec. 18, 1956

2,774,759

PREPARATION OF CHOLINE BASE AND CHOLINE SALTS

Eben G. Blackett and Arnold J. Soliday, Marietta, Ohio, assignors to American Cyanamid Company, New York, N. Y., a corporation of Maine No Drawing. Application January 6, 1955,
Serial No. 480,268

7 Claims. (Cl. 260—251.5)

This invention relates to an improved process of preparing choline base and choline salts and includes choline folate as a new chemical compound.

The use of choline and its salts as therapeutic agents has increased considerably and these agents now occupy an important place both in therapy and as a component along with other vitamins in various dietary supplements. However, because of the nature of choline and its salts it has been difficult to prepare choline and its salts in the high purities necessary when these products are intended for human consumption. Various physical properties and state of matter are also requisite when the products are to be incorporated into pills, capsules and tablets along with other materials. Efficient and economical means of producing choline and its various salts in pure form are, therefore, desirable and necessary.

The customary procedure for the preparation of choline base involves the preparation of choline chloride by any of the conventional procedures, and then treating the choline chloride with silver oxide or silver hydroxide to precipitate silver chloride, leaving the choline base which may then be converted to choline salts by reaction with a suitable acid.

In the described procedure, several steps are involved and the use of costly solvents is required which is an economic disadvantage since anhydrous choline chloride is an expensive starting material.

The present invention is based upon the discovery that when an aqueous solution of trimethylamine is reacted with ethylene oxide, the resulting aqueous solution of choline base can be used directly to prepare various choline salts by neutralization of the choline base with an appropriate acid.

The present invention thereby affords an economic advantage over the standard procedures since not only is an aqueous procedure more economical than the anhydrous choline chloride process, but it is not necessary to go through any steps to isolate the choline base as was necessary heretofore, nor are any costly solvents required since water is the only solvent used.

It has been proposed to prepare tricholine citrate by reacting approximately stoichiometric amounts of ethylene oxide with trimethylamine. In this process, the choline base is generally overneutralized with citric acid because of the presence of some unreacted trimethylamine. The tricholine citrate thus formed is contaminated with trimethylamine citrate which is formed as a consequence of the neutralization of the choline base with citric acid.

In a preferred embodiment of the present invention, we have discovered that by the use of a two-step neutralization procedure in the preparation of various choline salts, such as, for example, tricholine citrate, it is possible to obtain a product which is of a desirably light color and completely uncontaminated with trimethylamine citrate.

In this aspect of the present invention, the aqueous solution of the choline base, prepared as hereinbefore described, is partially neutralized with, for example, citric acid. The unreacted trimethylamine is then removed by distillation and the remaining choline base is neutralized by adding the required amount of citric acid. The upper limit of neutralization, namely, about 95%, is fairly critical since if somewhat more than 95% neutralization is accomplished, trimethylamine citrate is formed as a side reaction and which remains as a contaminant and which is undesirable when the products are to be used for human consumption. The lower limit of neutralization, however, is somewhat less critical. As a practical matter, not less than about 50% neutralization is ordinarily practical since with more free base present, the greater is the danger of producing a dark colored product. The preferred neutralization is of the order of 85–95%.

In the more general aspects of the present invention, an aqueous solution of the choline base is prepared by reacting approximately stoichiometric amounts of ethylene oxide with an aqueous solution of trimethylamine, keeping the temperature below about 30° C. In practice, there will still be unreacted trimethylamine and which is removed by vacuum distillation, since ethylene oxide is so reactive that various side reactions take place and a 5–15% excess is usually required if the trimethylamine is to be completely reacted. In actual practice, the distillation may be stopped before the evaporation is complete, leaving an aqueous solution of choline base at a convenient concentration of between 10 and 50%. The aqueous solution may then be diluted with water, sufficient to result in a 5–25% solution of the base, and this solution may then be used to prepare the various salts, either by the partial neutralization steps hereinbefore described if the excess trimethylamine has not been completely removed by vacuum distillation, or the various salts may be prepared by a simple neutralization of the choline base with an appropriate acid. The partial neutralization procedure, however, will generally produce a better colored product which is important with liquid preparations. The choline base procedure is usually satisfactory, however, if the product is to be isolated as a solid because most of the dark color washes out in the mother liquor.

While the removal of excess trimethylamine followed by neutralization of the choline base constitutes the preferred procedure and is necessary with liquid preparations, trimethylamine salts of other compounds may be removed by washing when the products are isolated as solids. In this connection, it is interesting to note that choline base is much more stable if the excess trimethylamine is not removed. Choline base without trimethylamine turns dark in a few days while choline base with trimethylamine shows little change in color after several months' storage.

The choline salts may be isolated by conventional means, as by the use of methanol, anhydrous alcohol, etc., or by the use of certain mixed solvents which form the subject matter of the copending application of Whiston and Smith filed concurrently herewith.

Suitable choline salts may be prepared with both organic and inorganic acids. Examples of inorganic acids are hydrochloric acid, nitric acid, phosphoric acid, sulfuric acid, and the like; examples of organic acids which may be used are acetic, propionic, butyric, stearic, and the like; dibasic acids such as oxalic, malonic, succinic, tartaric, citric, gluconic, and the like, as well as amino acids such as glycine, serine, alanine, glutamic, folic, and the like may be used. In general, any type of organic acid may be used if it has sufficient acidity to form a stable choline salt.

In certain instances, especially desirable salts are prepared by this process for certain uses, for example, the folic acid salt of choline. Choline folate, being made up of choline and folic acid, both of which are therapeutic agents, affords a compound useful for combination therapy where the effects of both choline and folic acid are desired. Furthermore, this salt affords a convenient means of incorporating both choline and folic acid into the vitamin formulations since only one compound need be added in place of two.

The invention will be described in greater detail in conjunction with the following specific examples in which the parts are by weight unless otherwise specified.

EXAMPLE 1

Tricholine citrate

To 236 parts of a 25% aqueous trimethylamine solution at 30° C. is added 40 parts of ethylene oxide. The mixture is then stirred until the reaction is substantially complete keeping the temperature below about 30° C. The concentration of the choline base in the reaction mixture is then determined potentiometrically and sufficient citric acid is added to neutralize 95% of the choline base present. Unreacted trimethylamine is then removed by distillation at 40–45° C. under a pressure of about 30–50 mm. Sufficient additional citric acid is then added to completely neutralize the choline base, which is present to give tricholine citrate. After treatment with activated charcoal and filtration at 50° C., the tricholine citrate is isolated by removal of the solvent by distillation under reduced pressure, the solution temperature being kept below 50° C. The tricholine citrate is formed in excellent yield. It has a desirable light color and only traces of trimethylamine.

EXAMPLE 2

Choline base

To 236 parts of a 25% aqueous trimethylamine solution at 30° C. is added 40 parts of ethylene oxide. The mixture is then stirred until the reaction is substantially complete, keeping the temperature below about 30° C. Unreacted trimethylamine is removed under vacuum at about 45–55° C., leaving the choline base in a 40–45% aqueous solution. The quality is excellent as only traces of inorganic salts and trimethylamine are present.

EXAMPLE 3

Dicholine folate

To 2422 parts of a 10% aqueous choline base solution is added 441 parts of folic acid; after clarifying with activated charcoal, the water is removed under vacuum resulting in a viscous mass. This is then dissolved in 1530 parts of methanol and the resulting solution is drowned into 10 times its volume of 1,4-dioxane. The choline folate is removed by filtration, washed with acetone and dried at 50–60° C. An almost quantitative yield of crystalline dicholine folate is produced.

EXAMPLE 4

Dicholine mucate

To 2422 parts of a 10% aqueous solution of choline base is added 210 parts of mucic acid. The aqueous solution is clarified by activated charcoal and then evaporated under vacuum to give a viscous mass. This is partially dissolved in 126 parts of methanol. The dicholine mucate is then precipitated by adding an equal volume of isopropanol to the methanolic solution. An excellent yield of dicholine mucate is obtained.

EXAMPLE 5

Mono choline phosphate

To 1211 parts of a 20% aqueous solution of choline base is added 98 parts of phosphoric acid. The aqueous solution is clarified by activated charcoal and concentrated under vacuum to a viscous mass, which is then dissolved in 316 parts of methanol. An equal volume of isopropanol is then added to the methanol solution and the crystalline choline phosphate is then removed by filtration. A good yield of mono choline phosphate (choline dihydrogen phosphate) is obtained. Methanol or anhydrous alcohol may be used for crystallizing the phosphate, but the yields are not as good as with the methanol-isopropanol mixture.

EXAMPLE 6

Choline stearate

To 302.5 parts of a 40% aqueous choline base solution is added 284 parts of stearic acid, dissolved in 276 parts of methanol. After stirring, the solution of choline stearate is given a decolorization treatment with activated charcoal and the clarified solution is then evaporated under vacuum to a slurry. This is poured on to dryer trays and then dried, giving the final stearate with physical characteristics similar to that of a soap.

We claim:

1. In the preparation of a choline salt wherein an aqueous solution of trimethylamine is reacted with ethylene oxide to form choline base, the improvement which comprises first partially neutralizing the aqueous solution of choline base with an acid, distilling off the unreacted trimethylamine under vacuum, and completely neutralizing the remaining choline base.

2. The process according to claim 1 in which the acid is citric acid.

3. The process according to claim 1 in which the acid is folic acid.

4. The process according to claim 1 in which the acid is mucic acid.

5. The process according to claim 1 in which the acid is phosphoric acid.

6. The process according to claim 1 in which the acid is stearic acid.

7. The process according to claim 1 in which the first neutralization is from about 85% to 95%.

References Cited in the file of this patent

UNITED STATES PATENTS

| | | |
|---|---|---|
| 2,153,591 | Roeder | Apr. 11, 1939 |
| 2,666,784 | Hopff et al. | Jan. 19, 1954 |

FOREIGN PATENTS

| | | |
|---|---|---|
| 134,220 | Switzerland | Oct. 1, 1929 |
| 379,260 | Great Britain | Aug. 25, 1932 |
| 515,092 | Germany | Dec. 20, 1930 |
| 593,258 | Germany | Feb. 23, 1934 |

OTHER REFERENCES

Meyer et al.: Ber. Deut. Chem. 54, 2274–82 (1921).